United States Patent
Lin et al.

(10) Patent No.: US 7,751,807 B2
(45) Date of Patent: Jul. 6, 2010

(54) METHOD AND SYSTEM FOR A HOSTED MOBILE MANAGEMENT SERVICE ARCHITECTURE

(75) Inventors: Daniel J. Lin, San Francisco, CA (US); Christopher K. Hess, San Francisco, CA (US)

(73) Assignee: Oomble, Inc., San Francisco, CA (US)

( * ) Notice: Subject to any disclaimer, the term of this patent is extended or adjusted under 35 U.S.C. 154(b) by 638 days.

(21) Appl. No.: 11/674,081

(22) Filed: Feb. 12, 2007

(65) Prior Publication Data

US 2008/0194276 A1 Aug. 14, 2008

(51) Int. Cl.
*H04M 3/00* (2006.01)
(52) U.S. Cl. ............... 455/418; 455/414.1; 455/466; 455/419; 455/420; 709/217; 709/218; 709/219
(58) Field of Classification Search ............ 370/310, 370/328; 709/203, 217, 219
See application file for complete search history.

(56) References Cited

U.S. PATENT DOCUMENTS

| | | | |
|---|---|---|---|
| 6,317,742 B1 | 11/2001 | Nagaratnam et al. | |
| 6,721,871 B2 | 4/2004 | Piispanen et al. | |
| 6,741,855 B1 * | 5/2004 | Martin et al. | 455/419 |
| 7,000,032 B2 | 2/2006 | Kloba et al. | |
| 2004/0002943 A1 | 1/2004 | Merrill et al. | |
| 2005/0208930 A1 * | 9/2005 | Zmrzli | 455/414.4 |
| 2005/0288044 A1 | 12/2005 | Atkins et al. | |
| 2006/0015649 A1 * | 1/2006 | Zutaut et al. | 709/246 |
| 2006/0047844 A1 * | 3/2006 | Deng | 709/231 |
| 2006/0052089 A1 * | 3/2006 | Khurana et al. | 455/414.1 |
| 2007/0169087 A1 * | 7/2007 | Fadell | 717/168 |
| 2008/0009268 A1 * | 1/2008 | Ramer et al. | 455/412.1 |
| 2009/0318124 A1 * | 12/2009 | Haughn | 455/418 |
| 2010/0017499 A1 * | 1/2010 | Martinent et al. | 709/219 |

OTHER PUBLICATIONS

International Search Report. Jun. 9, 2008.
Office Action. U.S. Appl. No. 11/862,179. Dated Jul. 30, 2009.

* cited by examiner

*Primary Examiner*—Rafael Pérez-Gutiérrez
*Assistant Examiner*—Neda Behrooz
(74) *Attorney, Agent, or Firm*—Patterson & Sheridan, LLP

(57) ABSTRACT

A hosted mobile management service is provided for enabling a user to access a centralized account through a web browser on a terminal in order to manage the user's media information, such as digital music and photos. Any modifications made by user through the web browser are transparently sent to the user's mobile device where a thin client application receives such modification information and interacts with the mobile device's file system to reconcile such modifications.

13 Claims, 7 Drawing Sheets

METHOD AND SYSTEM FOR A HOSTED MOBILE MANAGEMENT SERVICE ARCHITECTURE

FIELD OF THE INVENTION

The present invention relates generally to an architecture for a hosted mobile management service and, more specifically, techniques for managing media and other content residing on a mobile device with wireless network capabilities.

BACKGROUND OF THE INVENTION

Services and systems currently exist to synchronize certain types of personal data between a user's handheld device, such as a personal digital assistant ("PDA") or smart phone. In the mid 1990s, PDAs such as the PalmPilot by Palm Computing emerged to provide users with the ability to store addresses, phone numbers, email addresses, and personal notes in a small portable device. The PalmPilot would be coupled to a user's desktop PC via a cable in order to synchronize such information with a desktop application provided by Palm Computing to manage and modify such information more easily on the desktop. By the late 1990s, content synchronization services such as AvantGo began to appear to provide PDA owners with the capability to receive updated feeds from content providers (e.g., American Airlines, CNET, GM, Rolling Stone, The New York Times, etc.) via the Internet through a synchronization process whereby the PDA owner would connect his PDA, which had an installed PDA application to view content, to his PC, which also had an installed "conduit" application to download content from the content providers' web sites. In 1999, Research In Motion ("RIM") introduced the Blackberry, a wireless email portable device that solved the "two mailbox" problem (having a wireless email mailbox and a corporate email mailbox). A corporation supporting the Blackberry email synchronization system would install a proprietary RIM messaging server to interact with the corporation's own email system. The proprietary RIM messaging server situated at the corporation would interact with RIM's own proprietary remote messaging center server which would then relay corporate emails to the user's wireless provider, which would in turn deliver or push the emails to a user's Blackberry device. As such, emails addressed to a user's corporate email address would transparently appear on the user's Blackberry device in real-time without the need to manually synchronize in a manner similar to the prior PDA synchronization solutions discussed.

More recently, services such as Mobical and Yahoo! Mobile have utilized the SyncML open standard protocol promulgated by the Open Mobile Alliance to enable the transfer and synchronization of data between SyncML compliant native applications on the cell phone (e.g., phonebook, address book, contacts, etc.) and a SyncML compliant server over the cellular network (e.g., GPRS, 2.5G, 3G, 3.5G, etc.). Such a SyncML compliant server may also provide an online web environment for the user to view and modify such data. Similar to the prior PDA synchronization solutions (other than the Blackberry email push methods), many SyncML services typically focus on cell phone initiated manual synchronization. The user typically registers for a service by providing the SyncML application residing on the cell phone a username, password, server address and data paths for each native application function to coordinate synchronization. When the cell phone user desires to synchronize between the server and his phone, he navigates to the SyncML application and manually instructs the cell phone to initiate synchronization with the server. The SyncML registration process and the manual synchronization process can prove to be inconvenient and difficult to set up or use given the small size of the keypad (e.g., to type in registration information) and the time needed to navigate through the cell phones various menus. Most recently, Yahoo! Go Mobile introduced the capability to synchronize a user's emails and photos as well as the user's contacts and calendar managed at the Yahoo! Web site portal with the user's cell phone native applications. A Yahoo! mobile application is installed on the user's cell phone and appears as a separate application that can be launched from the cell phone's main menu. When the user launches the Yahoo! application on the cell phone, a Yahoo! submenu is presented to the user to provide access to the user's emails, contacts, calendar and photos. Running transparently in the background, the Yahoo! application on the cell phone polls a Yahoo! server (via the wireless network) to determine whether updates should be pulled from the user's Yahoo! account in the Yahoo! server into the cell phone.

With the continued convergence of portable devices functionally designed for personal information management ("PIM") such as PDAs with voice and other communication oriented portable devices such as the cell phone (any such wireless networked portable devices shall hereinafter be referred to herein as a "cell phone"), Mobical and the various Yahoo! services demonstrate that the industry is moving towards a single wireless networked portable device that can be transparently synchronized with a web site where a user's personal information may be more easily managed due to the availability of a larger screen and navigation tools, such as a keyboard, mouse and sophisticated graphical user interfaces ("GUI"). However, the inconvenience of cell phone initiated manual synchronization techniques currently available through Mobical and Yahoo! continue to inhibit the wider adoption of such hosted mobile management services. Furthermore, use of open standard synchronization protocols such as SyncML require application developers to have knowledge of the synchronization protocol in order to develop specific synchronizing components (or plug-ins) for synchronization protocol compliant applications. For example, SyncML requires local applications to record the changes to data made by the user so that such changes can later be transmitted to remote servers or devices for synchronization. SyncML makes use of a "change log", a local database that stores changes made by the user within a local application (e.g., adding or removing a contact). When the application data is synchronized with a remote server or device, those changes are sent to the remote server or device and applied to a remote copy of the application data. However, there exist many mobile applications that have been built without consideration of a change log, either to simplify the development effort or because the mobile application developers did not have the intention or forethought of synchronizing data. Many of these applications could benefit from allowing the data they store locally to be synchronized so that the data (1) could be backed-up or stored on a server, and (2) could be managed on a server where the user interface is more convenient and then have those changes synchronized back to the local application.

While there currently do exist non-SyncML synchronization mobile solutions, such solutions generally either (1) offer their own proprietary user-facing application on the cell phone with a "rich" user interface, or (2) require application developers to develop mobile applications that interface with a proprietary synchronization platform (i.e., through proprietary APIs, etc.). For example, PixSense, a company that enables a user to immediately upload digital photos taken from a user's cell phone camera to the PixSense website, requires the user to download and install a proprietary PixSense user facing application onto the cell phone through which the user must interact in order to manage and send photos to the PixSense website. Sharpcast is another recent company that offers a proprietary platform that enables independent software developers to utilize proprietary Sharpcast APIs during the software application development process to provide synchronization related capabilities between mobile devices, desktop applications and web services. What is needed is a synchronization architecture that enables a user to add, remove and otherwise manage content such as multimedia data (e.g., music, photos, video, ringtones, images, etc.) from the web to the phone (as opposed to an architecture that may require manual initiation of synchronization via the cell phone). Such an architecture should not require independent cell phone application developers to understand or write to either proprietary or standard synchronization APIs such that both pre-existing applications such as the native applications on the cell phone and newly developed applications can benefit from the architecture.

SUMMARY OF THE INVENTION

The present invention provides a wireless synchronization architecture wherein synchronization is managed and initiated through actions made by a user through a web site rather than through the cell phone. A thin client non-user facing application is installed on the cell phone and runs in the background to process synchronization requests received from a server wherein such server manages activities made by a user on a web site (such a server, hereinafter, may be generally referred to as the "web site"). As further described in the Detailed Description, the thin client application is able to interact with the cell phone's file system through a minimum set of file system operations or "primitives" (e.g., put a file/folder, get file/folder timestamp, get a file/folder size, add a file, delete a file/folder, replace a file/folder, copy a file, move a file/folder, rename file/folder, etc.). When the thin client application receives a synchronization initiation message from the web site through an "out of band" channel such as the Short Message Service ("SMS"), the thin client application extracts a number of identification numbers from the synchronization initiation message to: (1) track future messages between the cell phone and the web site during the synchronization session and (2) identify the web site initiating the communication. The thin client application then establishes a reliable network connection such as TCP through the cellular network with the web site and receives data and synchronization instructions from the web site until the synchronization process is completed. Once the synchronization process is completed, a user can thereafter access the appropriate cell phone application benefiting from the synchronization process (e.g., PIM tools, music player, photo album, etc.,) which shall have the most updated content as transferred from the web site.

More generally, a system is disclosed herein for enabling a user to utilize a web site to manage multimedia data for access by an application on a mobile device, wherein the mobile device supports data packet based communications over a mobile network system. As further described in the Detailed Description, such a system comprises: (1) a web server component configured to record actions taken by the user on the web site to manage the multimedia data, (2) a communications engine component configured to: (i) initiate a network connection with the mobile device, (ii) extract, for each action that relates to the application, a set of file system operation instructions specific to the application, and (iii) transmit each set of file system operation instructions to the mobile device through the network connection; and (3) a mobile software component resident on the mobile device, wherein the software component is configured to: (i) receive file system operation instructions from the communications engine component and (ii) perform file system operations corresponding to the received file system operation instructions on the file system of the mobile device.

Similarly, a method is disclosed herein for providing a user a web site to manage multimedia data for use by an application on a mobile device. Such a method comprises: (1) recording actions taken by the user on the web site, (2) extracting, for each action relating to the application, a set of file system operation instructions specific to the application, (3) initiating a network connection with the mobile device, and (4) transmitting each set of file system operations instructions to the mobile device through the network connection.

Unlike existing synchronization protocols such as SyncML, no change log need be maintained on the cell phone, and the server becomes responsible for keeping track of what has changed on the cell phone. In contrast, other synchronization protocols such as SyncML require the cell phone (or other mobile device) to be responsible for keeping track of local changes and transmitting those changes (via a change log) to the server on synchronization. As further detailed herein, a server in accordance with the present invention can determine what items have been added, removed, etc., on the cell phone either through timestamps or digests comparisons, and can then generate the correct set of commands to apply those changes to the data stored at the server (or additionally on other devices that the user may desire to synchronize). As further described in the Detailed Description, because different cell phones or other mobile devices may store data in different locations and may support applications that may maintain indexes to locate the data used by such applications, device-specific configuration information and management logic may be maintained on the server to support different cell phones or other mobile devices. However, allowing the server to manage the changes taking place on the cell phone alleviates the need to download new code (e.g., to support change log functionality) whenever a new mobile application is to be supported.

DETAILED DESCRIPTION OF THE INVENTION

A. Infrastructure Environment

Figure 1:
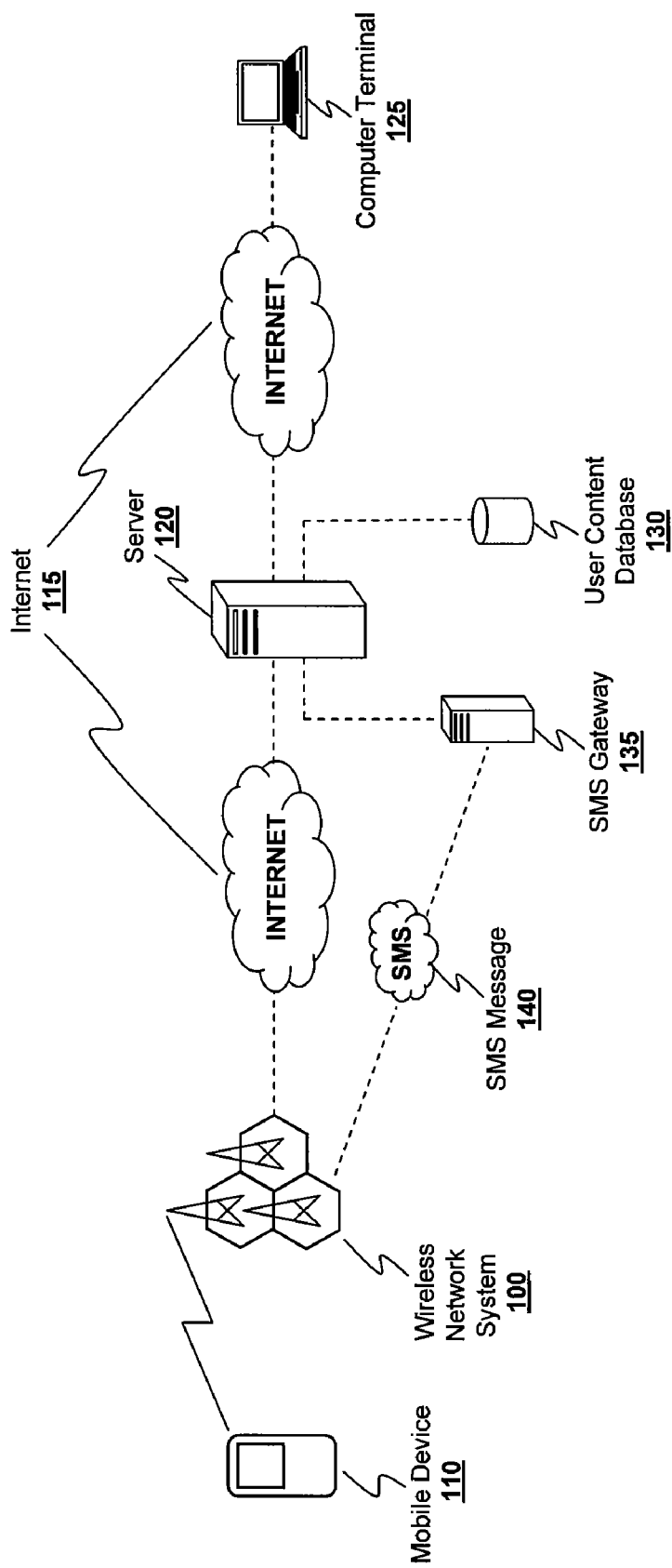
FIG. 1 depicts an embodiment of an infrastructure environment in which the present invention may be deployed.

FIG. 1 depicts one embodiment of an infrastructure environment in which to deploy the present invention. An underlying digital cellular wireless network system 100 in this environment may be a 3.5G network such as HSDPA/UMTS (High Speed Downlink Packet Access/Universal Mobile Telephone System). Other possible digital cellular wireless network systems would include, without limitation, all other forms of 2.5G (e.g., GPRS, EDGE, etc.), 3G (e.g., TD-SCDMA, CDMA2000, etc.), 3.5G and future generations of packet-switched cellular wireless technologies. Because the underlying digital cellular wireless network system 100 supports packet-switching capability, it is able to implement an IP-based network that supports TCP/IP based communications by mobile device 110. A current commercial example of a mobile device (e.g., smartphone, PDA handheld, etc.) that might be used in accordance with the present invention could be Motorola's SLVR cell phone which supports cellular communication technologies and includes an embedded iTunes digital music player application from Apple Computer. Additionally, the digital cellular wireless network system 100 also supports text messaging services such as SMS (Short Message Service) 140. The digital cellular wireless network system 100 may also provide the mobile device 110 access to the Internet 115 through its IP-based network capabilities.

By obtaining an IP address from the underlying digital wireless network system 100, the mobile device 110 is able to communicate through the digital cellular wireless network system 100 through the Internet 115 and ultimately to a server 120 that hosts a mobile management service in accordance with the present invention. In addition to communicating with the mobile device 110, such a hosted mobile management server 120 may also serve web pages to an end user using an Internet connected terminal with a web browser such as 125 (e.g., laptop, personal computer, etc.) in order to provide access to the user's personal account on the server 120. The server 120 may also be coupled to a user content database 130 in order to store user content (e.g., videos, digital photos, music files, games, ringtones, images, PIM information, other media files, etc.) at a centrally accessible location and an SMS gateway 135 in order to send SMS messages to the mobile device 110. As used hereinafter, the term and reference number "server 120" may be used generally to refer to the server side capabilities (as opposed to the client side capabilities) and therefore may include functionality resident in the database 130 and SMS gateway 135 as the context requires.

B. Component Architecture

Figure 2:
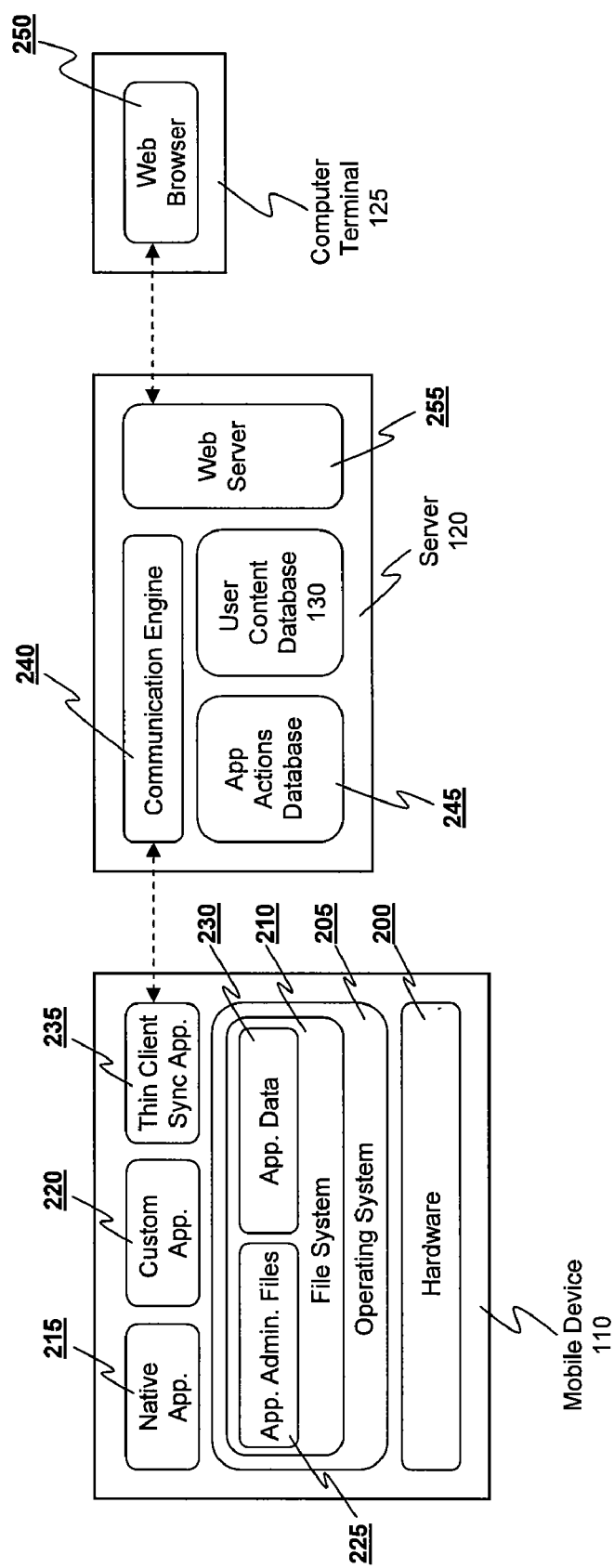
FIG. 2 depicts an embodiment of a component architecture of the mobile device and server in accordance with the present invention.

FIG. 2 depicts a component architecture of the mobile device 110 and the server 120 in accordance with the present invention. In a typical mobile device 110, on top of the hardware layer 200 lies an operating system layer 205 that contains a file system sub-layer 210. Applications residing on the mobile device 110 whether native applications 215 or custom applications 220 that are subsequently downloaded onto the mobile device 110 interact with the file system 210 by storing application specific administration files 225 such as index files to keep track of user configurations, default settings, data organization, etc. and application specific data files 230 such as songs and photos. The present invention envisions a thin client application 235 that is installed onto the mobile device 110 in order to execute instructions received from the server 120. The thin client application 235 interacts with the mobile device 110 at the file system layer 210 by adding to, removing from, or otherwise modifying the contents of the application specific administration files 225 and the application specific data files 230. Upon the thin client application's completion of instructions received from server 120, launching of the native applications 215 and custom applications 220 will benefit from the modifications made by the thin client application 235 to the underlying administration files 225 and data files 230 for such applications (e.g., view new photos added to the application specific data files 230 for the native photo viewer application, listen to a new song added to an existing playlist described in the index file that is an administration file 225 for the native music player application, etc.).

In one embodiment, the thin client application 235 continuously runs in the background and listens for SMS messages sent from the server 120 to the mobile device 110 through the SMS gateway 135. In alternative embodiments, the thin client application 235 may register itself to receive notification from the underlying mobile device operating system 205 that SMS messages intended for it have arrived (e.g., sometimes referred to as the "push registry" of the mobile device operating system). When such SMS messages arrive, the operating system 205 then launches the thin client application 235 to consume the SMS message. As previously discussed, the thin client application 235 may primarily be a passive application that interacts with the file system 210 of the mobile device 110 only after receiving specific instructions from the server 120. In particular, a communications engine component 240 of the server 120 may transmit such instructions to the thin client application 235 in response to actions (e.g., moving new photos into a mobile photo library, deleting a song from a mobile playlist, etc.) taken by the user to manage his data through the server's 120 web site that is hosted by the web server 255 and accessed through web pages served to the user's web browser 250. In order to determine the file system operations to be performed by the thin client application 235 that correspond to the user's data management actions on the web site, the communications engine 240 may query an application actions database 245. For each mobile application supported by the server 120, the application actions database 245 may maintain on ordered list of file system operation instructions (e.g., put a file/folder, get file/folder timestamp, get a file/folder size, add a file, delete a file/folder, replace a file/folder, copy a file, move a file/folder, rename file/folder, etc.) for each action (e.g., add a photo, remove a photo, add a photo to an album, add an album, etc.) that may be performed by such mobile application (or proxied by actions made by the user on the server's web site).

As an example of the foregoing discussion, in order to remove a song from a mobile playlist, the user may use the server's web site to drag and drop the song from the mobile playlist into a "trash" icon. Such an action by the user triggers the web browser 250 to communicate the action to the web server 255 which, in turn, communicates the action to the communications engine 240. The communications engine 240 may then query the application actions database 245 to determine the type, order and number of file system operations needed to remove the song from the actual mobile playlist residing on the mobile device 110. The application actions database 245 may respond to the communications engine 240 with the following file system operation instructions: (1) obtain the index file used by the music playing application (i.e., an administration file 225 for the music player application), and (2) rewrite a modified index file (as modified by the communications engine 250 after parsing the received index file from the thin client application 235 and making the appropriate changes to it) to the file system 210 with the song removed from the playlist. In turn, the communications engine 240 may then transmit the instructions to the thin client application 235 to carry out such file system operations on the mobile phone 110.

Similarly, other data management actions taken by the user through the web browser 250 may require additional user content residing in the user content database 130 to be transmitted to the mobile device 110. In particular, user content database 130 may provide users central storage space for their multimedia data such as videos, songs, digital photos, wallpaper images, ringtones, etc. User content database 130 may also store user account information for the server 120 such as the user's mobile phone number, the make and model of the mobile device 110 and the types of applications (native and/or custom) on the mobile device 110. The web pages served by web server 255 to web browser 250 may then be used as an interface for the user to easily manage and keep track of such multimedia data and move such multimedia data on and off the mobile device 110 in a single aggregate web session. Multimedia data can be added and stored in the user content database 130, for example, by uploading content that resides on the user's laptop 125 or personal computer (e.g., digital photos taken by the user's digital camera, e-commerce purchases of multimedia data conducted through services other then web server 255, etc.), by transferring content purchased by the user through e-commerce capabilities offered directly though the server's web site and then added directly to the user content database 130, or by uploading content generated by or purchased through the mobile device 110 and transferred to the server 120 (e.g., a digital photo taken by the digital camera of the mobile device 110). The user may, for example, drag and drop a digital photo stored in user content database 130 into his mobile photo library in order to add the digital photo to his mobile device 110. As previously described, such an action is relayed to the web server 255 and then to the communications engine 240, which then extracts the desired digital photo from the user content database 130 and queries the application actions database 245 for the proper file system operation instructions to add the desired digital photo to the mobile device 110 in a manner accessible by the picture viewing application on the mobile device 110 (whether a native application 215 or custom application 220). Once the communications engine 240 receives the list of file system operation instructions from the application actions database 245, it instructs the thin client application 235 to execute such operations on the file system 210 of the mobile device 110.

Those with ordinary skill in the art will recognize that the logical components set forth in FIG. 2 are merely exemplary and that other components and configurations that provide substantially similar functionality to that of the logical components in FIG. 2 can be used consistent with the spirit and scope of the invention. For example, while communications engine 240 is set logically apart from the web server 255 in FIG. 2, those with ordinary skill in the art will recognize that such separation is for logical discussion purposes only and that actual code implementations of the foregoing may not necessarily utilize such logical distinctions. In one exemplary configuration, web server 255 components containing the web server functionality described herein, the communications engine 240 and other capabilities described in the foregoing may be implemented as Java servlets that interact with a web server supporting servlet technology such as Apache Tomcat. Similarly, while the application actions database 245 and the user content database 130 are described as separate logical databases, those with ordinary skill in the art will also recognize that such databases may utilize the same underlying database platform or technology (e.g., MySQL, etc.) or may be implemented programmatically through data that is statically embedded in various source code files.

C. User Interface

Figure 3:
FIG. 3 depicts an embodiment of web pages served by the web server of the hosted mobile management server to the user's web browser.
Figure 3:
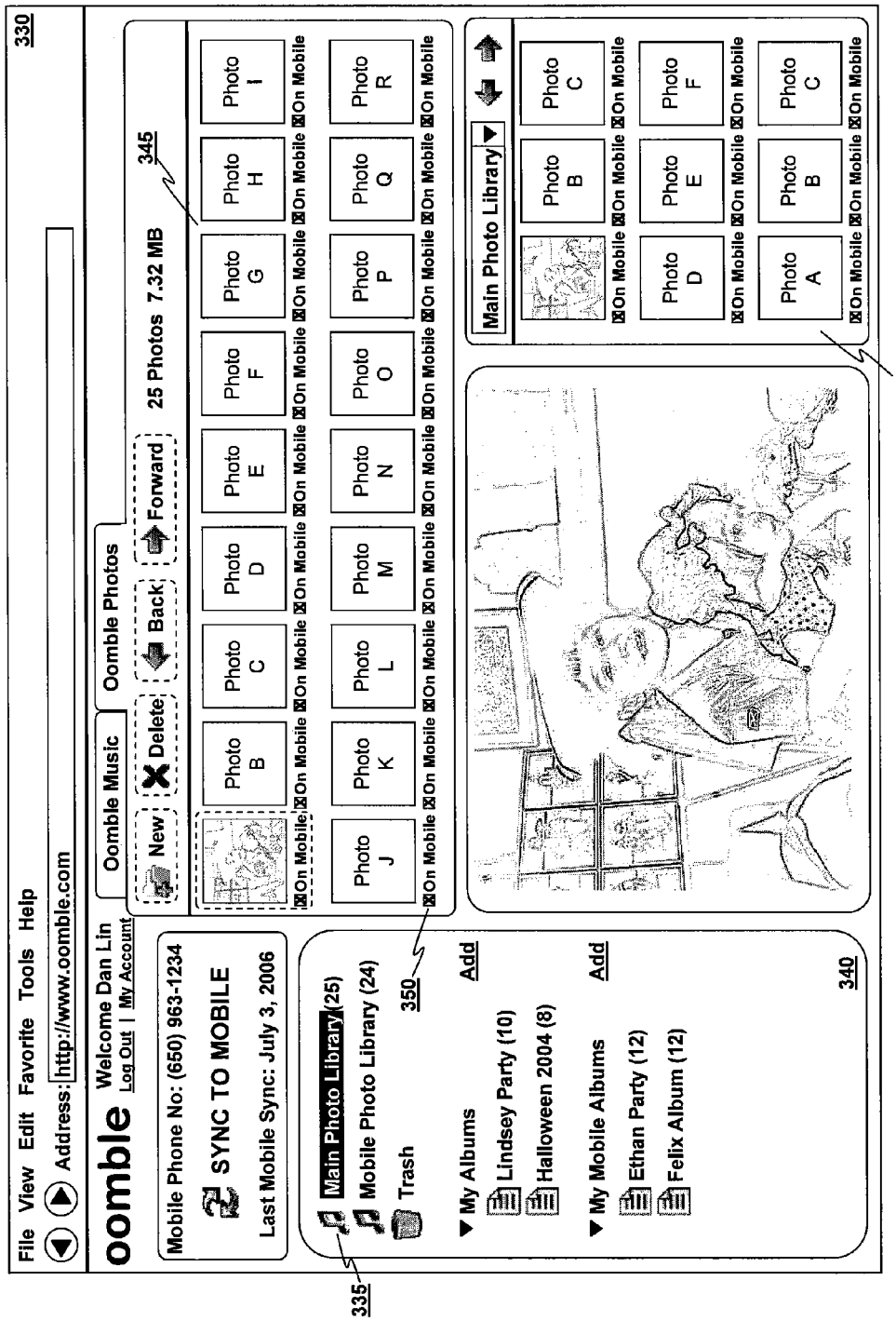

FIG. 3 depicts one embodiment of certain web pages that may be served by the web server 255 of the hosted mobile management server 120 to the web browser 250 to provide the user the ability to view the data residing on both the server 120 and on the mobile device 110. For example, the web browser view 300 depicts a user interface for music. Main panel 305 provides a view of all the songs that the user has stored in the user content database 130. Correspondingly, the "Main Music Library" selection of the navigational panel 315 has been highlighted. Below the "Main Music Library" selection is a "Mobile Music Library" 320 selection which, if selected, would modify the contents of main panel 305 such that only those songs that also are stored in the mobile device 110 (as application data 230) are displayed. As shown in FIG. 3, such songs are also indicated by the mobile indicator column 325. To manage his songs, the user may easily drag and drop songs displayed in main panel 305 into libraries, playlists or the trash icon as set forth in navigational panel 315. As previously described, such actions taken by the user on web browser view 300 may trigger actions that are communicated by communications engine 240 to the mobile device 110.

Web browser view 330 similarly depicts a user interface for photos. Because the "Main Photo Library" selection 335 is highlighted in the navigational panel 340, the main panel 345 depicts thumbnails of all the photos store on the server 120 for the user. Main panel 345 also displays below each thumbnail a mobile indicator 350 to display which photos are also stored on the mobile device 110. Similar to the web browser view for music 300, the user may easily drag and drop photo from the main panel 345 into the secondary panel 355 (or vice versa) or navigational panel 340 to manage the photos on the server 120 and mobile device 110.

In one embodiment, changes to data made by the user through the web browser 250 are captured and tracked in the aggregate by the web server 255 until the user completes his session, whereby the communications engine 240 communicates with the thin client application 235 to propagate the relevant changes to the mobile device 110. In alternative embodiments, each separate change made by the user in real time may trigger a separate communication between the communications engine 240 and the thin client application 235 to propagate the change to the mobile device 110

Those with ordinary skill in the art will recognize that FIG. 3 is merely exemplary of numerous ways to display user data stored on the server 120 and mobile device 110 that remain consistent with the spirit and scope of the present invention. For example, while FIG. 3 only depicts user interfaces for music and photos, those with ordinary skill in the art will recognize that other types of user data can be similarly stored, managed and viewed including videos, ringtones, images, games, wallpaper and PIM data. In addition to a variety of other types of user data that can be managed and displayed to the user through the server's web site, other types of user interface designs may also be envisioned that would be consistent with the scope of the present invention. For example, rather than utilizing web views such as 300 and 330 that are similar to standard email user interfaces (such as Outlook, Yahoo! Mail, etc.), a user interface that simulates the make and model of the user's mobile device may also be used. In such an interface, by dragging and dropping available user data such as wallpaper and ringtones into the mobile device simulator, the user may be able to immediately view and hear his modifications on the displayed mobile device simulator prior to synchronizing with the actual mobile device 110. Furthermore, the server's 120 web site may also integrate functionality and/or interact with other online service providers such as online music stores and photo sharing sites to enable sharing of user data and the purchase of new user data that is immediately stored in user content database 130.

D. Communication Protocol

Figure 4:
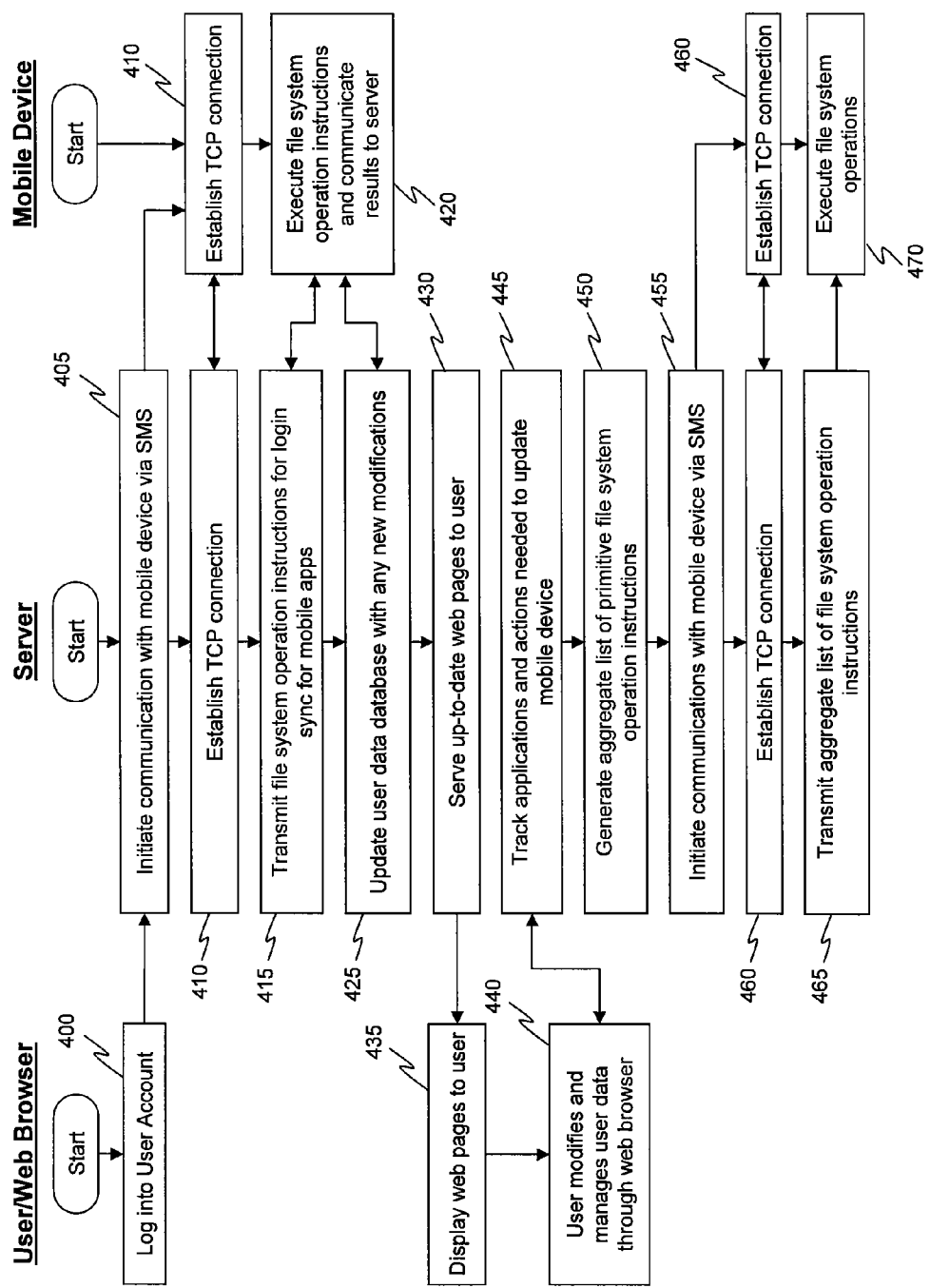
FIG. 4 depicts a flow chart detailing the communication protocol among the mobile device, server and user's web browser in accordance with the present invention.

FIG. 4 depicts a communication protocol among mobile device 110, server 120, and the user during a data management session conducted by the user through the server's 120 web site. Initially, the user logs into his user account on the server's 120 web site though the web browser 250 (step 400). Due to the user's prior enrollment or registration with the server 120, the server 120, by accessing the user's account data in user content database 130, may have knowledge of the user's mobile phone number, the make and model of the mobile device 110 and the types of applications (native and/or custom) on the mobile device 110. Through the information stored in the application actions database 245, server 120 may also have knowledge of the file system operations used by such applications to interact with the file system 210 (e.g., where administration files and data files are located in the file system 210 and what format they take, etc.). For example, certain picture viewing applications on certain mobile devices may utilize an index file to keep track of the photos accessible by the application while other picture viewing applications may simply use the folder structure of the file system itself 210 to keep track of the photos. Upon the user's login, web server 225 instructs the communications engine 240 to initiate communication with the mobile device 110 (step 405). In one embodiment, such initiation occurs by transmitting an SMS message via the SMS gateway 135 to an SMS port number on which the thin client application 235 is listening. The SMS message may include the IP address of the server 120 and a session identifier (e.g., session number) used by the server 120 to keep track of the particular communication session between it and the thin client application 235. As previously discussed, depending upon the embodiment, for example, upon receiving the SMS message, the thin client application 235 may either be launched by the mobile device's 110 push registry or may directly receive the SMS message as a continually running background application that listens for messages on the specified SMS port. The thin client application 235 may then extract the IP address of the server 120 from the SMS message and establish a TCP connection with the server 120 by connecting to the IP address and identifying itself through the session identifier (step 410). Those with ordinary skill in the art will recognize that other types of network communication protocols other than TCP may be used without departing from the spirit of the invention including HTTP and other IP based network protocols. Similarly, out of band channels other than SMS may be utilized in step 405.

Once a network connection is established between the thin client application 235 and the server 120, the communications engine 240 identifies the various supported applications on the user's mobile device 110 by querying the user content database 130. The communications engine 240 may then extract various file system operation instructions from the application actions database 120 for such applications and may then direct the thin client application 235 to perform such file system operations to assess whether file system folders and/or files used by the various supported applications on the mobile device 110 have been modified since the user's last login to the server 120 (e.g., the user may have taken and saved a new photo through the mobile device's own camera or may have deleted a song from a mobile playlist using the mobile device's keypad) (step 415). For example, for a particular picture viewer for a particular mobile device, the communications engine 240 may request that the thin client application 235 transmit the timestamp of the file system folder (i.e., a file system operation) that stores the photos accessed by the picture viewer of the mobile device 110. If the timestamp of the folder differs from the date known by the server 120 as the last date upon which the contents of the folder were modified, then the server 120 may recognize that the user may have made modifications to the folder subsequent to the user's last login with the server 120. In such instance, the communications engine 240 may additionally request the thin client application 235 to transmit a directory listing of the folder in order to assess what new photos were added (and subsequently download such new photos to the server 120 for storage in the user content database 130) or old photos removed. In similar fashion, if a music application uses an index file to internally manage which music files are used by the application and their locations, the communications engine 240 may request that the thin client application 235 transmit the timestamp for the index file used by the mobile device's 110 music player for keeping track of the songs and playlists on the mobile device 110 to assess whether modifications had been made since the user's last login to the server 120 (and take subsequent reconciliatory steps in view of such assessment). Once the mobile device 110 has completed executing the file system operations and communicated the appropriate results back to the communications engine 240 (step 420), the communications engine 240 is able to modify the user content database 130 with any updates as communicated by the mobile device 110 (step 425). The web server 255 is then able to serve web pages to the user's web browser 250 that reflect an up-to-date view of what data is on the server as well as what data is on the mobile phone 110 as depicted in FIG. 3 (steps 430 and 435).

While the user makes various modifications to the data through the web browser 250, for example, as previously discussed in conjunction with FIG. 3 (step 440), the web server 255 tracks which corresponding mobile applications need updates and records the number and type of actions (e.g., add photo, add song, remove song from playlist, add a photo to an album, remove a song, remove a photos, etc.) needed to be performed on the mobile device 110 for such applications (step 445). Once the user has completed his session on the web browser 250, by referencing the application actions database 245, the communications engine 240 generates an aggregate list of file system operation instructions needed for each action made by the user during the web session (step 450). Depending upon the particular embodiment, the TCP connection established during the initial login process may be retained during the entire session or communications engine 240 may send another SMS message (with the IP address and a session identifier number as similarly used during the login process) to the thin client application 235 in order to establish another TCP connection (steps 455 to 460). Once the TCP connection is established, the communications engine 240 may transmit to the thin client application 235 the file system operation instructions to be performed by the thin client application 235 on the mobile device's file system 210 in order to reflect the changes made by the user to the web browser 250 (step 465 to 470).

Figure 5:
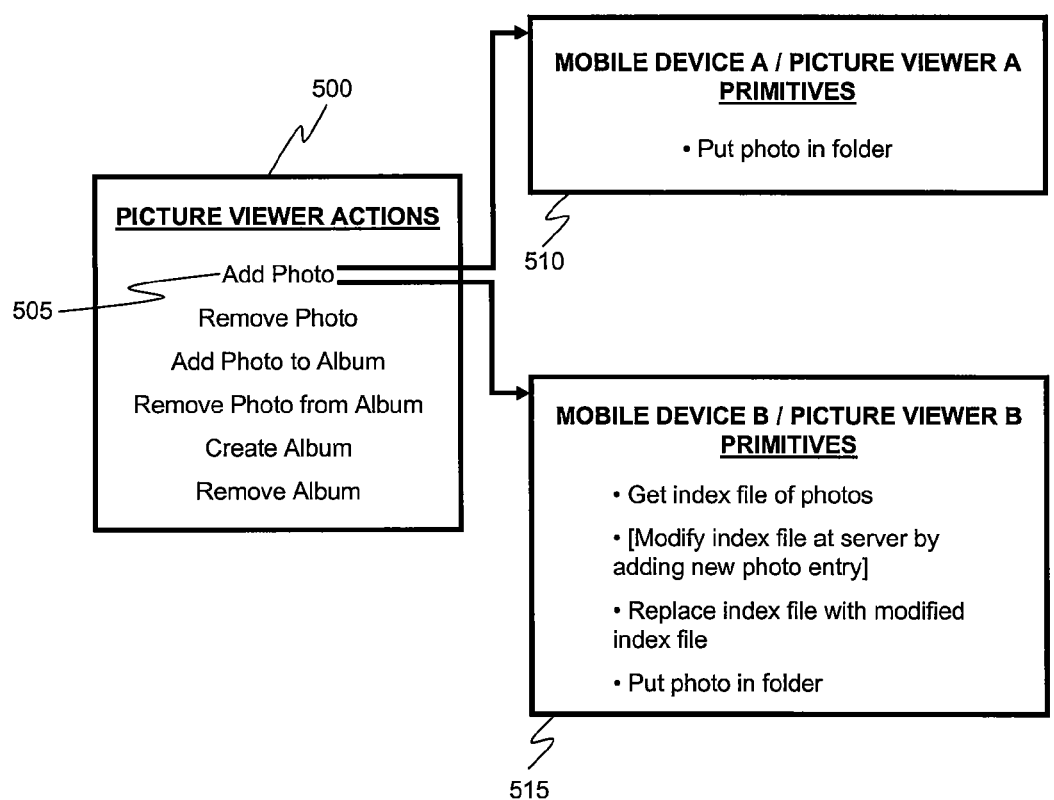
FIG. 5 depicts a list of actions for a picture viewing application and the file system operations that may be associated with such actions.

FIG. 5 illustrates an example of possible actions that can be made to a photo viewing application and the file system operations that need to be performed on the file system 210 of the mobile devices for such actions to take place. As shown in FIG. 5, the interaction of mobile applications with the mobile file system 210 may differ even if the action taken by the user on the web browser is the same, depending upon the application and the make and model of the mobile device. As shown in 500, there may be a number of actions that can be made by a user through a picture viewing application, such as adding a photo, removing a photo, adding a photo to an album, etc. A user may choose, for example, to add a photo stored in the user content database 130 to the mobile device 110 which corresponds to action 505 in FIG. 5. If the mobile device 110 is of a particular make and model "A" and utilizes a particular picture viewer application "A", adding a photo may simply require the communications engine 240 to transmit the photo to the thin client application 235 in order to perform one file system operation, namely, putting the photo file in the appropriate folder (see 510). In contrast, if the mobile device 110 is of a particular make and model "B" and utilizes a particular picture viewer application "B" (which utilizes an additional index file to keep track of photos on the mobile device), adding a photo may require the communications engine 240 to instruct the thin client application 235 to perform multiple file system operations as depicted in 515. Determination of which file system operations need to be performed for actions relating to a particular application on a particular mobile device may be done through reverse engineering techniques or in cooperation with the application provider or developer. For example, the developer of picture viewer application "B" for mobile device B in FIG. 5 may provide the server 120 a "plugin" that provides lists of the file system operations needed to be performed on the file system 210 of mobile device "B" for each of the actions listed in 500, including list 510. The content of such plugins may ultimately be stored in application actions database 245 for future access by the communications engine 240.

E. Enrollment Process

Figure 6:
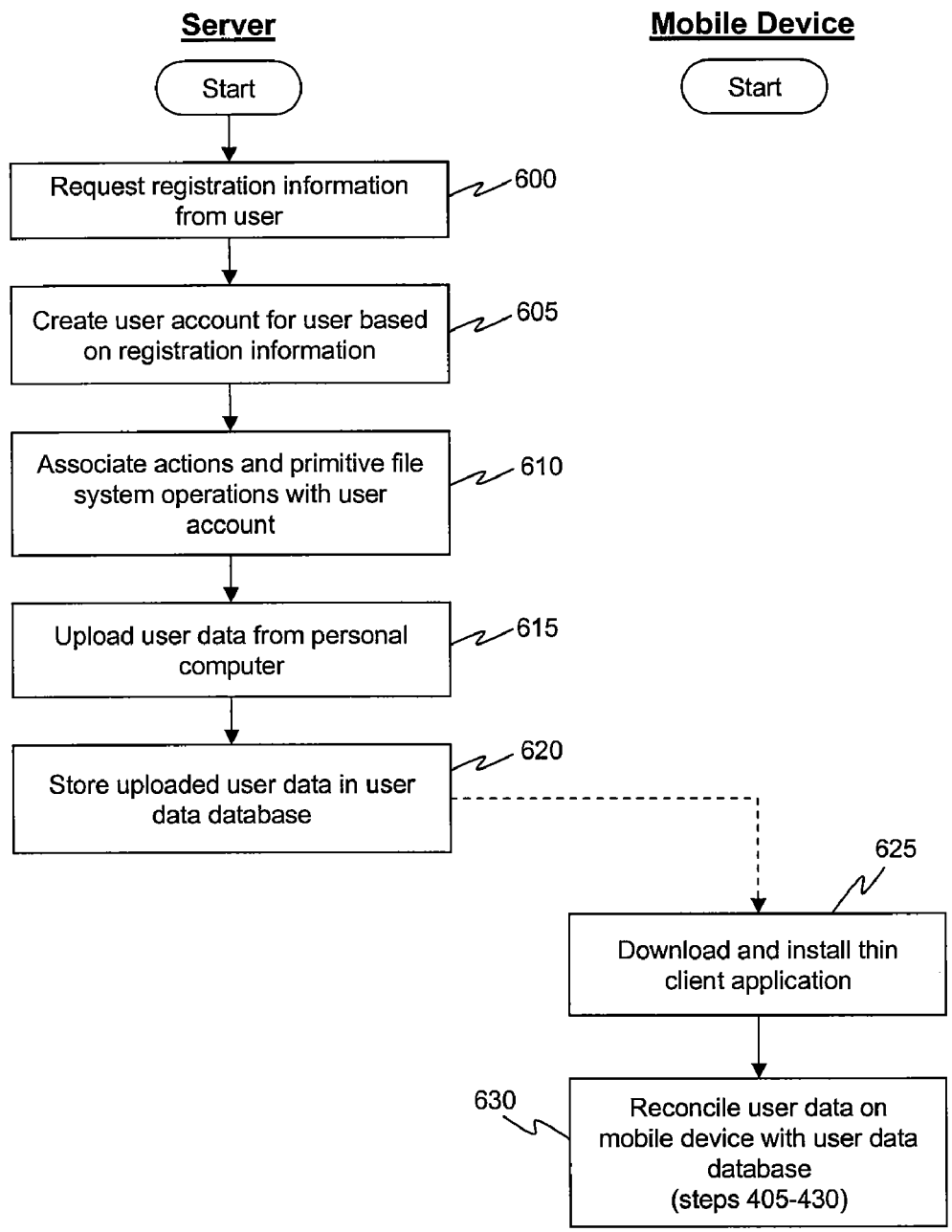
FIG. 6 depicts a flow chart for enrolling an end user in a hosted mobile management service in accordance with the present invention.

Prior to using the hosted mobile management services offered by server 120, a user possessing mobile device 110 may need to enroll with the server 120 through the server's web site. In one embodiment, enrollment may take place at the user's personal computer 125 that also locally stores user's pre-existing digital music library and photos. As depicted in FIG. 6, at step 600, web server 255 requests registration information from the user including, for example, a username, password, mobile phone number, make and model of the mobile device 110, carrier service provider, any custom applications installed on the mobile device 110, etc. At step 605, the web server 255 then creates a user account for the user based upon such registration information. The registration information may enable server 120 to determine what native and custom applications (215 and 220) are utilized on the mobile device 110, and therefore, at step 610, determine the appropriate lists of file system operation instructions stored in application actions database 245 to associate with the newly created user account. At step 615, the user may upload his user data such as his pre-existing digital music library (or portions thereof) and/or digital photos (or portions thereof) stored on his personal computer 125 to the server 120 and, at step 620, the server 120 stores the user's uploaded data in the user content database 130, associating such user data with the newly created account. Those with ordinary skill in the art will recognize that any index files, playlist files, album files, preference files, online music store and online photo site usernames and passwords and other music or photo management files relating to the pre-existing digital music library and photo library on the user's personal computer 125 may also be uploaded (and translated, to the extent such files are in proprietary formats of third party media applications such as iTunes) to the server 120 and/or the database 130. Similarly, those with ordinary skill in the art will recognize that other techniques of updating or accessing such user data may include accessing other web sites such as photo sharing or storing sites where the user's photos and other data may be centrally stored. At step 625, mobile device 110 may download and install the thin client application 235 from the server 125. Those with ordinary skill in the art will recognize that alternative methods of downloading the mobile device software module 500 may be utilized. For example, known methods using direct over-the-air ("OTA") download techniques may be utilized to download and install the thin client application 235 to the mobile device 110. In one such OTA technique, the server 125 may utilize the SMS gateway 135 to send to the mobile phone number of the mobile device 110 (as received in step 600) an SMS message containing a URL (Universal Resource Locator) to the file containing the thin client application 235 or to a web page containing a link to such a downloadable file. Once such an SMS message is received by the mobile device 110, the user may utilize the information in the SMS message to download (e.g., copy the URL address into the mobile device's 110 web browser in order to fetch the thin client application installation file) the thin client application 235. Alternatively, the web server 255 may simply provide such URL or other address information directly to the user through the web browser 250 and instruct the user to manually download the thin client application onto the mobile device 110 by manually entering the URL (or other address) into the web browser of the mobile device 110. In yet another scenario, the server 120 may request that the user couple the mobile device 110 to the personal computer 125, for example, through a USB connection, Bluetooth connection, WiFi connection or any other connection available between a mobile device 110 and the personal computer 125 known to those with ordinary skill in the art such that the thin client application may be downloaded to the personal computer 125 and subsequently transferred to the mobile device 110 through such connection. Once the thin client application 235 is downloaded and installed onto the mobile device 110, if the mobile device 110 contains a pre-existing user data, the communications engine 240 may communicate with the thin client application 235 to obtain such data and reconcile it with the data obtained through step 615 (step 630). The steps in such communication would be similar to steps 405 to 430 in FIG. 4. Once the end user has completed the enrollment process with the hosted mobile management service, he will subsequently be able to log into the server 120 from any online terminal and manage his user data on the mobile device 110 through the server's 120 web site.

F. Personal Computer Software Module

In one embodiment of the present invention, during the enrollment process as described in FIG. 6, the server 120 may also transmit for installation a software module to the user's personal computer 125 in order to monitor actions taken by the user through desktop applications or other web sites. Such a downloaded software module may assist the user to maintain consistency between user data stored on personal computer 125 and on server 120. For example, the user may utilize a desktop music management tool such as iTunes on his personal computer 125 to modify the contents and organization of his locally stored music library (e.g., add a song, delete a song, purchase a song, modify a playlist, add a song to a playlist, remove a song from a playlist, etc.). In such instances, the downloaded software module may recognize such modifications, for example, by recognizing an updated timestamp made to the iTunes index file and may initiate a TCP connection with the server 120 to communicate such modifications to the server 120. For example, if the user purchased a new song through iTunes, the downloaded software module may transmit the newly purchased song to the server 120 for storage in the user content database 130. Similarly, if the user downloads to his personal computer 125 a set of digital photos from a third party photo sharing web site or from a received email attachment, the downloaded software module may recognize the addition of such new photos to the user's local photo storage folder and propagate such photos to the user content database 130 on the server 120. Those with ordinary skill in the art will recognize that different embodiments of the downloaded software module may also respond to communications initiated by the server 120 in order to propagate changes to the user content database 130 made by end user through the web browser 250 to the user's local data store. For example, the server 120 may transmit playcount, purchased music, and playlist modifications to the downloaded software module in order to update the library, playlist and playcounts of the user's local iTunes desktop application.

G. Alternative Embodiments

While the present invention has been primarily described with music and photos as the main media that are managed by the mobile management service hosted by server 120, those of ordinary skill in the art will recognize that alternative media and embodiments may be implemented without departing from the spirit and scope of the claimed invention. As previously discussed, other forms of mobile media and data such as video, ringtones, images, wallpaper, mobile games, email, and PIM information may also be managed through a web-enabled server in accordance with the techniques described herein. Although the present invention has been described with reference to alternative embodiments, those of ordinary skill in the art will recognize that changes may be made in form and detail without departing from the spirit and scope of this disclosure. For example, rather than being a primarily passive application that interacts with the file system 210 only upon instructions received from the communication engine 240, an embodiment of the thin client application 235 may be configured to also initiate communications with the communication engine 240 upon actions initiated by the user on the mobile device 110. For example, purchase of content such as songs through the mobile device 110 (e.g., mobile device's web browser) may cause the thin client application 235 to immediately transmit a copy of the purchased song to the server 120 for update (i.e., rather than waiting for a server initiated login process as detailed in FIG. 4 to recognize and reconcile such additions). Similarly, any changes made by the end user on the mobile device 110 to any of the playlists on the mobile device can also be communicated to the hosted mobile management service 130 in a similar fashion. Similarly, as described in some of the further alternative embodiments below, a thin client application 235 may offer more functionality (e.g., launching applications, installing games, ringtones and wallpaper, remotely controlling applications, etc.) than interacting through file system operations. Such thin client applications may be more tightly integrated with the operating system 205 of the mobile device and/or the mobile applications on the mobile device (e.g., through APIs provided by the mobile applications, etc.).

In one alternative embodiment, mobile devices that are not focused on communication, such as digital cameras and portable music players, may be enabled with SMS and IP-based cellular networking capabilities. The thin client application 235 may be installed on such mobile devices such that content may be added to or removed from such mobile devices through the server 120 in a convenient fashion. For example, photos taken by a digital camera may be easily transmitted to the user's account at the server 120 or songs purchased online may be easily transmitted to the portable music player through the server 120. Similarly, cellular network enabled automobiles may also install the thin client application 235 such that songs may be added or removed from a media store accessible by the stereo of the automobile.

In another embodiment, the server 120 may facilitate the sharing of content on mobile devices among friends. In such an embodiment, an owner of a mobile device may, through enhanced functionalities provided by the web site of the server 120, allocate a certain amount of memory on the mobile device to be controlled and accessed by his friends. Such friends would have the freedom and capability to add content to their allocated memory space on the owner's mobile device by utilizing the capabilities of the server 120 and thin client application 235 at their convenience. The owner would access and view such content, in turn, at his own convenience. For example, a friend may desire to purchase a song as a gift for the owner of the mobile device through the web site of the server 120. Once the friend successfully purchases the song, server 120 may store the song in user content database 130 under the account of the owner of the mobile device. The communications engine 240 may then initiate a communication session with the thin client application 235 similar to steps 455 through 470 of FIG. 4 to transmit the song to the owner's mobile device. The song may be stored in a memory space of the mobile device that has been specifically allocated by the owner to the friend. The owner may then be able to claim the song, for example, by logging into the web server 255 and accepting the gift, whereby the thin client application 235 then moves the song from the friend's memory space to the correct folder utilized by the mobile device's music player application (or otherwise modifies the index file of the mobile device's music player application to recognize the location on the file system of the added song). Those with ordinary skill in the art will recognize a variety of different functionalities and business models consistent with the spirit of the foregoing sharing embodiment. For example, the owner of the mobile device may also allocate memory space on the mobile device for specific advertisers to add content to the mobile phone. The advertiser may add and remove packages of content (e.g., ringtones, images, wallpaper, songs, videos, etc.) at its convenience to its allocated memory space through the thin client application 235 which the owner of the mobile device may view or consume at his own convenience. From a business model perspective, the advertiser may pay the owner of the mobile device for the right to use "lease" space on the owner's mobile phone and so long as the advertiser sees that the owner continues to view or consume the content provided by the advertiser to the owner's mobile device, the advertiser may find it worthwhile to continue leasing such space and adding new content.

Another embodiment may offer the capability to control the real-time playing of music on the mobile device by redirecting music playing commands from the web browser 250 through the web server 255 and to the mobile device 110. Such an embodiment may be utilized in an environment where the mobile device 110 may be coupled to external speakers in order to play the music residing in the mobile device to a larger audience. The thin client application 235 in such an embodiment may have the capability to launch the music player application on the mobile device 110 pursuant to instructions transmitted to it by the communications engine 240. The user is then able to control the mobile music player through the web browser 250 by propagating playing directions (e.g., play, next track, previous track, fast forward, rewind, etc.) to the thin client application 235.

Those of ordinary skill in the art will additionally recognize that the control logic and data stored and used by the various software components as described in the foregoing specification are merely illustrative and may be redistributed various other software components and databases in alternative but functionally equivalent designs, including the removal of certain software components and/or databases, without departing from the scope or spirit of the described embodiments. For example and without limitation, the present invention has been described using TCP/IP based connections, but those of ordinary skill in the art will recognize that other packet based protocols, either on layered on top of TCP/IP, such HTTP, or as an alternative to TCP/IP may also be used to establish data transfer sessions. Terminology used in the foregoing description is for the purpose of describing the particular versions or embodiments only, and is not intended to limit the scope of the present invention which will be limited only by the appended claims. As used herein and in the appended claims, the singular forms "a," "an," and "the" include plural references unless the context clearly dictates otherwise. Similarly, the words "for example", "such as", "include," "includes" and "including" when used herein shall be deemed in each case to be followed by the words "without limitation." Unless defined otherwise herein, all technical and scientific terms used herein have the same meanings as commonly understood by one of ordinary skill in the art. All publications mentioned herein are incorporated by reference. Nothing herein is to be construed as an admission that the embodiments disclosed herein are not entitled to antedate such disclosure by virtue of prior invention. Thus, various modifications, additions and substitutions and the like can be made without departing from the spirit of the invention and these are therefore considered to be within the scope of the invention as defined in the following claims.

What is claimed is:

1. A system for enabling a user to utilize a web site to manage multimedia data for access by an application on a mobile device, wherein the mobile device supports data packet based communications over a mobile network system, the system comprising:
    a web server component resident at a server configured to transmit web pages of the web site to the user at a terminal separate from the mobile device and record actions taken by the user on the web site at the terminal intended to manage multimedia data residing on the mobile device;
    a communications engine component resident at the server configured to:(i) transmit an SMS message to the mobile device, wherein the SMS message comprises an IP address of the server, in order to establish a network connection with the mobile device, (ii) establish the network connection with the mobile device, (iii) identify, for each action taken by the user on the web site that relates to multimedia data accessible on the mobile device through the application, a set of file system operation instructions required to perform the action on the mobile device in a manner compatible with the interaction of the application on the mobile device with the file system of the mobile device, and (iv) transmit each set of file system operation instructions to the mobile device through the network connection; and
    a mobile software component resident on the mobile device, wherein the mobile software component is configured to: (i) launch upon receipt by the mobile device of the SMS message by a push registry of the mobile device, (ii) receive file system operation instructions from the communications engine component and (iii) perform file system operations corresponding to the received file system operation instructions on the file system of the mobile device.

2. The system of claim 1 further comprising an actions database coupled to the communications engine component for storing sets of file system operation instructions relating to the actions taken by the user on the web site.

3. The system of claim 2 wherein certain of the actions taken by the user relate to at least one different application on the mobile device.

4. The system of claim 3 wherein certain of the sets of file system operation instructions stored on the actions database are specific to the at least one different application on the mobile device.

5. The system of claim 2 wherein the communications engine component is configured to query the actions database in order to extract, for each action that relates to the application, a set of file system operation instructions specific to the application.

6. The system of claim 2 further comprising a content database coupled to the communications engine component for storing at least a portion of the multimedia data.

7. The system of claim 6 wherein at least one file system operation instruction stored in the actions database relates to copying multimedia data stored in the content database to the mobile device.

8. The system of claim 1 wherein each file system operation instruction received by the mobile software component corresponds to one file system operation performed by the mobile software component.

9. The system of claim 1 wherein the mobile software component is further configured to run in the background.

10. The system of claim 1 wherein the mobile software component is further configured to: (i) extract the IP address from the SMS message and (ii) establish the network connection as a TCP connection with the communications engine component through the IP address.

11. The system of claim 1 wherein the mobile network system is a cellular network system.

12. The system of claim 1 wherein the web server component is a Java servlet.

13. The system of claim 1 wherein the multimedia data is selected from the group consisting of songs, videos, photos, images, ringtones, mobile games and personal contact information.

* * * * *